(12) United States Patent  
Tunley et al.

(10) Patent No.: US 6,629,709 B1
(45) Date of Patent: Oct. 7, 2003

(54) WHEEL/RAIL ADHESION ENHANCEMENT

(75) Inventors: John David Tunley, Derby (GB); Graham Edward Curtis, Ilkeston (GB)

(73) Assignee: AEA Technology plc, Didcot GB (GB)

( * ) Notice: Subject to any disclaimer, the term of this patent is extended or adjusted under 35 U.S.C. 154(b) by 0 days.

(21) Appl. No.: 09/979,115

(22) PCT Filed: May 8, 2000

(86) PCT No.: PCT/GB00/01747
§ 371 (c)(1),
(2), (4) Date: Jan. 29, 2002

(87) PCT Pub. No.: WO00/71399
PCT Pub. Date: Nov. 30, 2000

(30) Foreign Application Priority Data

May 19, 1999  (GB) .............................................. 9911658
Mar. 3, 2000  (GB) .............................................. 0005055

(51) Int. Cl.$^7$ ............................................. B60B 39/00
(52) U.S. Cl. ............................. 291/2; 291/3; 291/19; 188/35; 246/182 B
(58) Field of Search ............................. 291/2, 11.1, 15, 291/3, 19, 46; 246/182 B, 168.1; 342/352; 188/5, 6, 7, 35; 364/426.02

(56) References Cited

U.S. PATENT DOCUMENTS

| | | | | |
|---|---|---|---|---|
| 2,766,056 A | * | 10/1956 | Hudson | 291/2 |
| 3,093,399 A | * | 6/1963 | Smith | 291/2 |
| 3,140,110 A | * | 7/1964 | Wonner | 291/2 |
| 3,707,311 A | * | 12/1972 | Sharp | 303/196 |
| 3,964,796 A | * | 6/1976 | Bremer | 303/178 |
| 5,244,259 A | * | 9/1993 | Pickenhahn et al. | 303/137 |
| 5,428,538 A | * | 6/1995 | Ferri | 701/71 |
| 5,579,013 A | * | 11/1996 | Hershey et al. | 342/357.06 |
| 5,775,228 A | * | 7/1998 | Lamba et al. | 105/73 |
| 6,244,673 B1 | * | 6/2001 | Konrad et al. | 303/142 |

FOREIGN PATENT DOCUMENTS

DE   2401709     *   7/1975
EP   078655 A2   *   5/1983

* cited by examiner

Primary Examiner—S. Joseph Morano
Assistant Examiner—Frantz F. Jules
(74) Attorney, Agent, or Firm—William H. Holt

(57) ABSTRACT

If the wheel/rail adhesion for a railway vehicle is insufficient then the wheels may slip when braking. If slipping is detected, a control system may reduce the brake pressure to permit a controlled level of slip and so to optimize the braking force for the available adhesion. By determining the pressure supplied to the brake cylinder, a signal may be obtained which indicates the value of the adhesion. Alternatively the adhesion may be monitored by detecting any discrepancy between the braking deceleration demanded by the driver and the observed deceleration. The adhesion signal may activate a warning. It may also be used to adjust the rate at which sand is supplied by a sander to the wheel/rail interface. The rate at which sand is supplied may also be adjusted in accordance with other parameters such as the train speed.

9 Claims, 1 Drawing Sheet

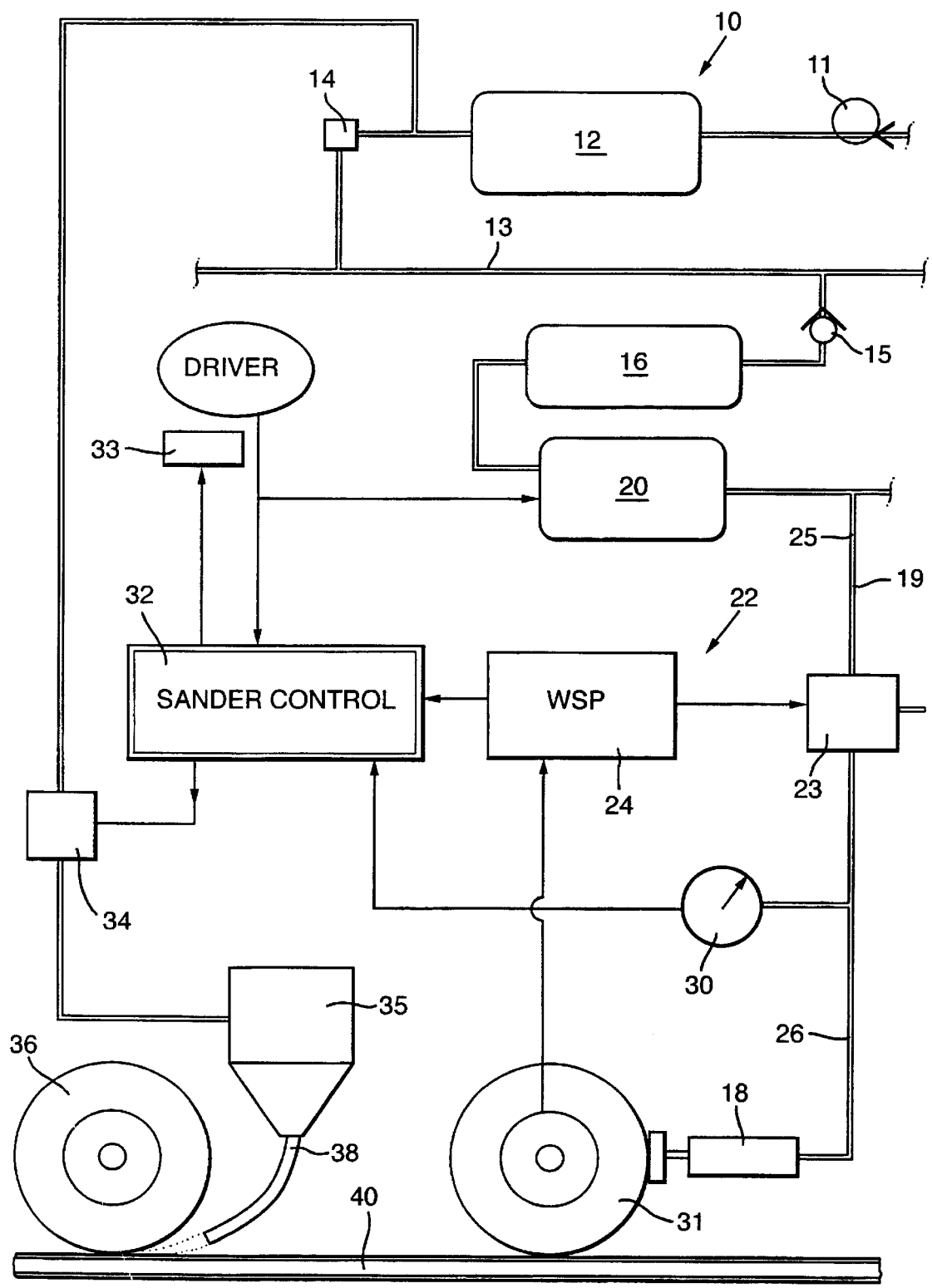

WHEEL/RAIL ADHESION ENHANCEMENT

This invention relates to a method and an apparatus for determining the wheel/rail adhesion for a railway vehicle on a railway track, and for enhancing that adhesion.

If the wheel/rail adhesion for a railway vehicle is insufficient, then the wheels may slip when the vehicle attempts to accelerate or to brake. This has been a recognised problem for many years, and the application of sand onto the rails has long been used to enhance adhesion. The sand may be applied manually, or it may be supplied using compressed air, for example in response to a measured value of the deceleration of the wheels (as in GB 1 349 145 (Girling)). It has also been suggested, in EP 0 217 636 (Mitsubishi), that the quantity of sand particles dispensed may be adjusted in accordance with the speed of the vehicle. An alternative way of dealing with this problem during braking is to monitor both vehicle speed and wheel speeds, and if slipping is detected to reduce the brake pressure, for example to permit a controlled level of slip; for example the wheels might be allowed to slip so that they turn at a rate say 10 or 15 percent less than that corresponding to the vehicle's speed. Such wheel slide protection systems are currently in use. Controlled slipping of the wheels optimises the braking force, and also tends to remove contamination from the rail head.

According to the present invention there is provided a method for determining the wheel/rail adhesion for a railway vehicle, the method comprising monitoring operation of the braking system when the brakes are applied, and hence determining the value of the adhesion.

In one embodiment the vehicle incorporates an accelerometer, and the method comprises comparing the deceleration measured by the accelerometer to the deceleration demanded by the driver, and determining from any discrepancy between those values of deceleration the value of the adhesion. In an alternative embodiment the vehicle incorporates a wheel slide protection system which modulates the pressure in a brake cylinder in response to detection of wheel slip, and the method comprises determining the pressure supplied to the brake cylinder, and determining from that pressure the value of the adhesion.

The value of adhesion may be indicated to the driver of the vehicle. If exceptionally low adhesion is identified in this way, a warning message may be transmitted to other vehicles on the line, and to signalling staff. Where the method involves determining the pressure supplied to the brake cylinder, the pressure may be measured, or alternatively may be calculated, for example by a computer in the wheel slide protection system.

The present invention also provides a method for enhancing the wheel/rail adhesion for a railway vehicle by applying adhesion-enhancing particles to the wheel/rail interface at a rate which is adjusted in accordance with the value of the adhesion so determined.

The adhesion-enhancing particles may be particles of sand or quartz or other suitable material and may be supplied dry, using compressed air. The rate at which the particles are supplied may also be adjusted in accordance with other measured values, in particular the vehicle's speed, and preferably also the vehicle's deceleration. Furthermore the rate at which particles are supplied may also be adjusted in accordance with the desired deceleration, as specified by the driver. Currently in the United Kingdom trains which dispense sand do so at a standard rate of 2 kg/min. Adjusting the rate of supply of particles in accordance with vehicle speed to higher values than that, at higher speeds (say above 50 km/hr), will enable improved braking performance to be achieved, while reducing the rate of supply to lower values than that, at low speeds (say below 15 km/hr), will minimise the problems caused to the track circuit.

The invention also provides an apparatus for enhancing the wheel/rail adhesion for a railway vehicle, by adjusting the rate of supply of adhesion-enhancing particles in the manner defined above. The rate of supply of particles may be continuously variable, or alternatively the rate of supply may be adjustable in steps. It will be appreciated that any such apparatus is desirably arranged so that if the adjustment fails, the apparatus should revert to dispensing the particles at a constant rate (e.g. 2 kg/min).

The invention will now be further and more particularly described, by way of example only, and with reference to the accompanying drawing which shows a flow diagram for a train braking system.

BRIEF DESCRIPTION OF THE DRAWING

The drawing is a flow diagram and illustrates a preferred embodiment of a braking system for a train.

Referring to the drawing, a train braking system 10 incorporates an air compressor 11 and main air reservoir 12 which maintains the air pressure in a train brake pipe 13 at a value above atmospheric pressure, for example at 7 atmospheres (700 kPa). Air from the main reservoir 12 is supplied to the train brake pipe 13 via a pressure reducing valve 14, and hence via a check valve 15 to a brake reservoir 16 in each vehicle of the train. In each vehicle, air from the brake reservoir 16 is supplied to brake cylinders 18 (only one is shown) through a brake pipe 19, there being a pair of brake cylinders 18 for each wheel set in the vehicle, the air supply being controlled by the driver by means of a controller 20. Typically the controller 20 adjusts the brake pressure in steps—for example slight, moderate, and high braking, up to maximum (emergency) braking.

The system 10 also includes, in each vehicle, a wheel slide protection (WSP) system 22 which consists of a WSP valve 23 in the brake pipe 19 to each wheel set, whose operation is controlled by a computer 24. The WSP valve 23 effectively separates the pipe 19 into an inlet pipe 25 and an outlet pipe 26. The valve 23 can be in one of three states: in one state the air pressure in the inlet pipe 25 is supplied to the outlet pipe 26 (and so to the brake cylinder 18); in a second state the inlet pipe 25 is closed off, while the outlet pipe 26 is open to the atmosphere through a choke; and in the third state both the inlet pipe 25 and the outlet pipe 26 are closed off. The computer 24 receives input data indicating the rotation rate of each wheel, and calculates the speed of the vehicle, and hence determines if a wheel is slipping. If this occurs, then the computer 24 controls the WSP valve 23 in the pipe 19 to the brake cylinders 18 for that wheel set; the WSP valve 23 changes to the second state so the pressure supplied to the brake cylinders 18 gradually decreases. The degree of slip may be monitored at frequent intervals, for example every 30 ms, and each WSP valve 23 operated accordingly. If the degree of slip is acceptable then the WSP valve 23 changes to the third state so the pressure in the brake cylinder 18 remains constant. If the wheel stops slipping, then the WSP valve 23 changes to the first state so the pressure in the brake cylinder 18 is again increased.

Such wheel slide protection systems 22 are known. They come into effect only if wheel slip occurs, and under those circumstances the brake pressure is modulated as described, so that the wheel turns at a rate about 10 or 15 percent less than that required by the speed of the train. This optimises the braking effect.

The system 10 also incorporates, in the front vehicle of the train, a pressure sensor 30 which measures the pressure in the outlet brake pipe 26 and hence in the brake cylinder 18. This is preferably in the pipe 26 for the leading wheel set 31. If the wheels are slipping, the pressure so measured provides a measure of the adhesion between the front wheels 31 and the rail 40. An electrical signal provided by the sensor 30 is supplied to a sander control unit 32, which may operate a display 33 in the driver's cab, for example if the adhesion is exceptionally low.

The sander control unit 32 also receives electrical signals indicating the brake level demanded by the driver, and signals from the WSP computer 24 indicating the calculated vehicle speed and the presence of wheel slip. The control unit 32 hence calculates the amount of sand needed to achieve the required deceleration. This is output as a control signal to a sand control valve 34 connected pneumatically to two sand hoppers 35 (only one is shown) mounted each side of the front vehicle just in front of the third wheel set 36. The air pressure supplied to the sand control valve 34 is that of the main reservoir 12. Each hopper 35 includes a dispensing nozzle 38 through which dry sand is ejected onto the rail 40 just in front of the wheels 36, at a variable rate which depends upon the signals received from the sander control unit 32.

Thus when the driver wishes to slow or stop the train he applies air pressure to all the brake cylinders 18 at a pressure determined by the controller 20. If any wheel set starts to slide, then the wheel slide protection system 22 reduces the pressure in the brake cylinder 18 of that wheel set to control the amount of slip, and provides a signal indicating wheel slip to the sander control unit 32. If the front wheel set 31 of the train is slipping, a signal is provided to the sander control unit 32 by the pressure sensor 30 indicating the degree of adhesion. If the adhesion is below a threshold value, then the hoppers 35 are activated to dispense sand onto the interface between the third wheel set 36 and the rail 40. This will improve the adhesion for the wheel set 36, and for all subsequent wheel sets in the train, as the sand tends to clean the rail head as the wheels roll over it. The lower the value of adhesion (as indicated by the sensor 30), the more sand is dispensed. The rate of dispensing of sand is also adjusted in accordance with the speed of the train. Hence, if the ideal level of adhesion improvement is achieved, the third and subsequent wheel sets will stop slipping. However as the leading wheel set 31 is unsanded, this will still slip and act as a detector of low adhesion, so ensuring that sand is still applied whilst low adhesion conditions are detected on the rails 40.

It will be appreciated that an apparatus for enhancing the wheel/rail adhesion for a railway vehicle may differ from that described above while remaining within the scope of the invention. In particular the pressure in the brake cylinder 16 might be calculated by the computer 24 of the corresponding wheel slide protection system 22, rather than being measured by a pressure sensor 30.

An alternative embodiment does not require the pressure sensor 30, and is applicable to vehicles which do not incorporates a wheel slide protection system 22; in other respects the system incorporates the features described above. In this embodiment the sander control unit 32 receives signals from an accelerometer (not shown) which may be incorporated within the sander control unit 32. As described earlier, the sander control unit 32 receives electrical signals indicating the brake level demanded by the driver. This brake level may be continuously variable, or may be adjustable in steps, for example slight braking, moderate braking, high braking, and emergency braking; these steps typically correspond to decelerations of 0.3, 0.6, 0.9, and 1.2 m/s$^2$ respectively if the vehicle does not slip. The sander control unit 32 determines if the deceleration measured by the accelerometer differs from the demanded deceleration by an amount greater than a threshold value. Any such discrepancy between the values of deceleration indicates poor adhesion, and the greater the discrepancy the lower is the adhesion. The sander control unit 32 may operate a display 33 in the driver's cab, for example if the adhesion is exceptionally low.

The sander control unfit 32 can hence calculate the amount of sand needed to achieve the demanded deceleration in accordance with the observed adhesion. As described above in relation to the system 10, this is output as a control signal to a sand control valve 34. The rate at which sand is ejected onto the rail 40 may be continuously variable, or may be variable in steps. For example sand might be ejected at rates of 0.5, 1.0, 1.5 or 2.0 kg/min in accordance with the demanded deceleration, and the discrepancy between the values of deceleration.

Particularly at low speeds, the application of sand onto the rail 40 may increase the electrical resistance between the rail 40 and the wheels to such an extent that the track circuit does not detect the train. This problem may be mitigated by reducing the rate at which sand is dispensed at such low speeds. Alternatively or additionally a sensor may be provided to monitor the track circuit current through the axle of a wheel set behind the sander hoppers 35, and reducing the sand dispensing rate if the current becomes too low. A suitable sensor for this purpose is described in GB 99 08599.5.

It will be appreciated that the system for enhancing the wheel rail adhesion as described to improve railway braking performance may also be used to enhance traction performance. Wheel spin in traction may also be detected by the wheel slide protection system 22 and signalled to the sander control unit 32, so that an appropriate amount of sand may be deposited to increase tractive effort whilst minimising the risk to the track circuit. The sand flow rates may be adjusted according to train speed, the effect on track circuits, or the traction motor current on electrical powered stock. This latter current acts as an indicator of the adhesion level in a similar way to the brake pressure described earlier.

What is claimed is:

1. A method for enhancing wheel/rail adhesion for a railway vehicle, the method comprising the steps of: monitoring operation of the braking system when the brakes are applied, hence determining the a value of the adhesion, and applying adhesion-enhancing particles to the wheel/rail interface at a rate which is adjusted in accordance with the value of the adhesion so determined; the value of the adhesion being determined in at least one of the following ways:

a) the vehicle incorporates an accelerometer, and the method comprises comparing the deceleration measured by the accelerometer to the deceleration demanded by the driver, and determining a value of the adhesion from any discrepancy between those values of deceleration;

b) the vehicle incorporates a wheel slide protection system that modulates the pressure in a brake cylinder in response to detection of wheel slip, and a value of the adhesion is determined from a determination of the pressure supplied to the brake cylinder.

2. A method as claimed in claim 1 wherein the value of the adhesion is determined from a determination of the pressure supplied to a brake cylinder, and wherein the particles are applied to a wheel/rail interface that is behind the wheel on which the said brake cylinder acts.

3. A method as claimed in claim 1 also comprising the step of providing a warning indication if the value of the adhesion is below a threshold value.

4. A method as claimed in claim 1 wherein the adhesion-enhancing particles are supplied dry.

5. A method as claimed in claim 1 in which the rate at which adhesion-enhancing particles are applied is also adjusted in accordance with the speed of the vehicle.

6. A method as claimed in claim 1 in which the adhesion-enhancing particles are applied at a rate that is adjusted to one of a plurality of different non-zero values.

7. An apparatus for enhancing wheel/rail adhesion for a railway vehicle, the apparatus comprising means to determine a value of the adhesion by monitoring operation of the braking system when the brakes are applied, and means for applying adhesion-enhancing particles to the wheel/rail interface, at a rate which is adjusted in accordance with the value of the adhesion so determined in at least one of the following ways:

a) the vehicle incorporates an accelerometer, and the adhesion-determining means comprises means to compare the deceleration measured by the accelerometer to the deceleration demanded by the driver, and to determine a value of the adhesion from any discrepancy between those values of deceleration;

b) the vehicle incorporates a wheel slide protection system that modulates the pressure in a brake cylinder in response to detection of wheel slit, and the adhesion-determining means determines the adhesion from a determination of the pressure supplied to the brake cylinder.

8. An apparatus as claimed in claim 7 in which the particle-applying means adjusts the rate of supply in steps.

9. An apparatus as claimed in claim 7 wherein the adhesion-determining means determines the adhesion from a determination of the pressure supplied to a brake cylinder, and wherein the particle-applying means applies the particles to the interface between the rail and a wheel that is behind the wheel on which the said brake cylinder acts.

* * * * *